United States Patent [19]
Wesner et al.

[11] 3,967,495
[45] July 6, 1976

[54] INSTRUMENT FOR TESTING A PNEUMATIC CONTROL SYSTEM OF A VEHICLE TRANSMISSION

[75] Inventors: Michael D. Wesner, Peoria; Harold J. Nauman, Dunlap, both of Ill.

[73] Assignee: Caterpillar Tractor Co., Peoria, Ill.

[22] Filed: Mar. 3, 1975

[21] Appl. No.: 554,935

[52] U.S. Cl. .................................... 73/118; 73/37
[51] Int. Cl.² ...................................... G01M 13/02
[58] Field of Search ............ 73/118, 168, 115, 49.7, 73/37

[56] References Cited
UNITED STATES PATENTS

| | | | |
|---|---|---|---|
| 1,265,953 | 5/1918 | Pittman | 73/115 |
| 2,547,377 | 4/1951 | Juhasz | 73/396 X |
| 3,133,553 | 5/1964 | Frantz | 73/396 X |
| 3,418,843 | 12/1968 | Bosshart | 73/37 |

*Primary Examiner*—Jerry W. Myracle
*Attorney, Agent, or Firm*—Phillips, Moore, Weissenberger Lempio & Strabala

[57] ABSTRACT

A diagnostic instrument detects and locates malfunctions in a pneumatic circuit of the kind which controls a transmission in response to movement of an operator's shift lever. One or more connectors enable simultaneous coupling of a plurality of pneumatic signal lines with various key flow paths of the transmission control circuit. The signal lines extend through a cable to an instrument housing containing a pressure indicator and having a plurality of test valves for sequentially connecting individual ones of the signal lines to the indicator whereby the presence or absence of pressure at various key points in the control circuit may be quickly determined. As the pressures to be detected may be transitory in certain parts of the circuit, means are provided for maintaining the indicator in the pressure indicating condition following a momentary sensing of pressure and reset means are provided for restoring the indicator following testing of each particular flow path so that a subsequent flow path may then be tested. Means are also provided for directing compressed air to any selected one or ones of the circuit flow paths through the test instrument independently of the operator's shift control. Gages are also present on the instrument for determining the exact value of pressures at selected points in the control circuit.

8 Claims, 2 Drawing Figures

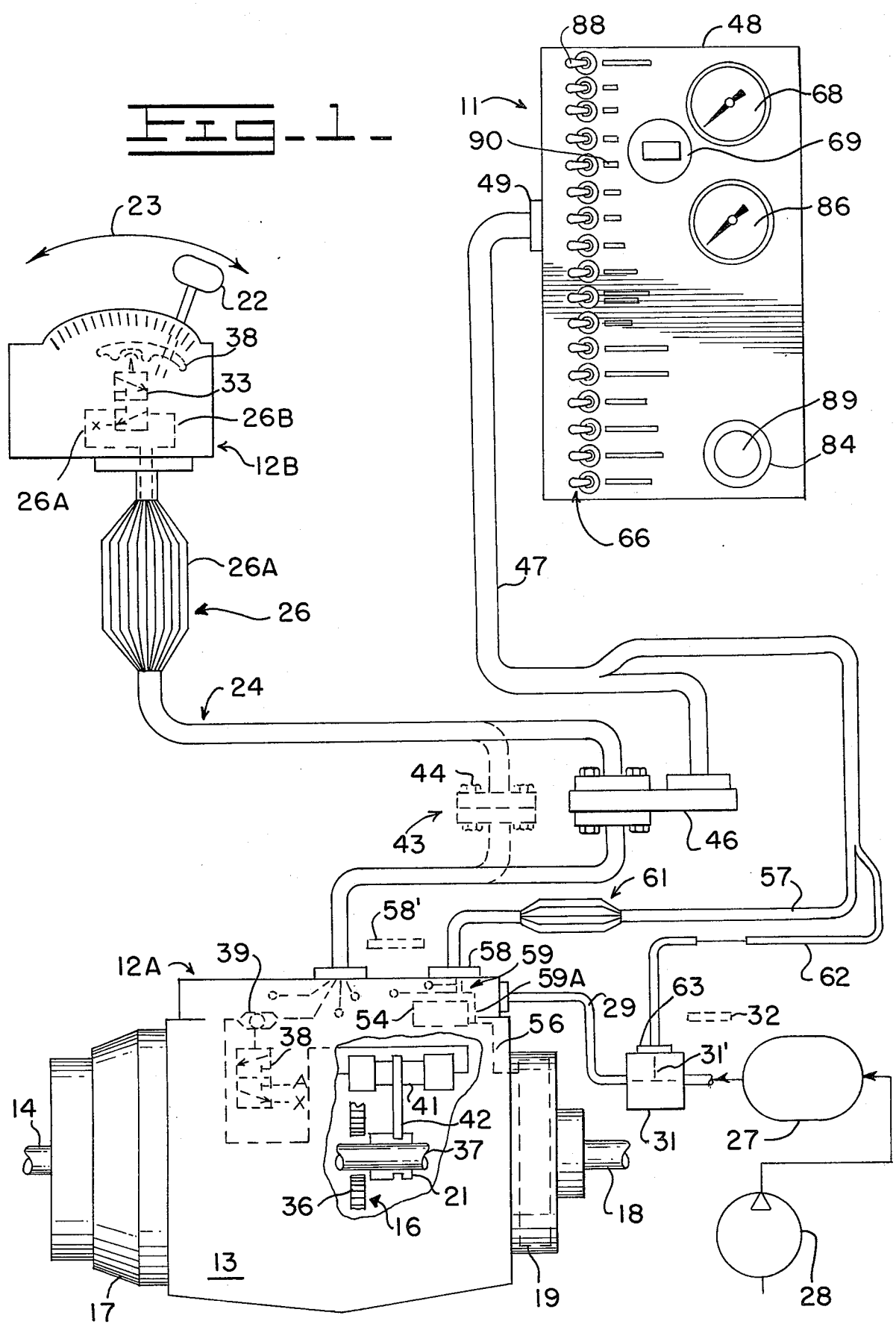

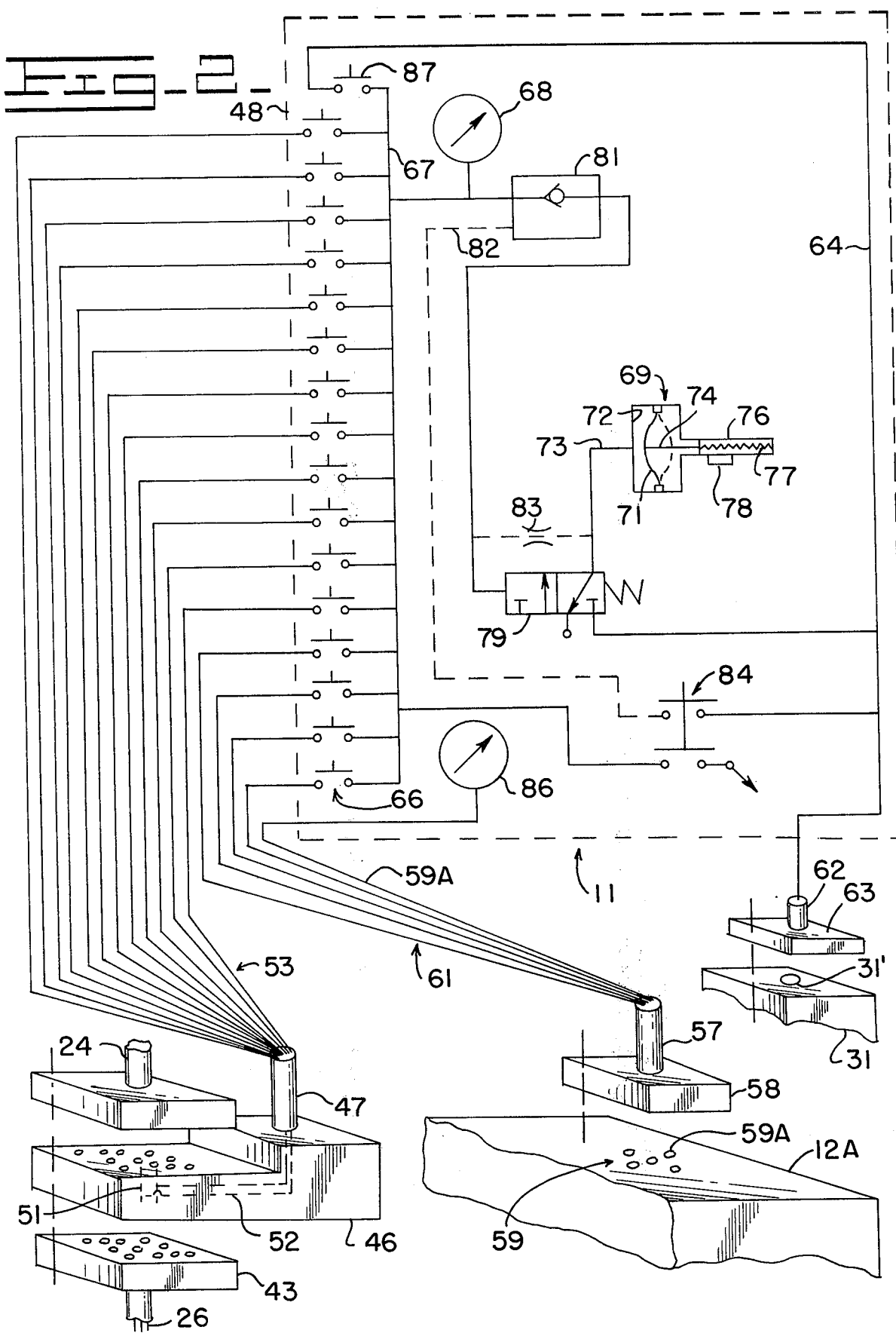

INSTRUMENT FOR TESTING A PNEUMATIC CONTROL SYSTEM OF A VEHICLE TRANSMISSION

BACKGROUND OF THE INVENTION

This invention relates to diagnostic instruments for facilitating the maintenance and repair of vehicle transmissions and more particularly to an instrument for facilitating the detection and location of malfunctions in a pneumatic circuit which controls a transmission in response to movements of an operator's control lever or the like.

Prior U.S. Pat. No. 3,508,540 discloses a form of semi-automatic transmission for vehicles or the like in which clutching, braking and gear shifting operations required for effecting a change of speed ratio or drive direction or both are all accomplished and sequenced by pneumatically operated devices in response to movement of an operator's control lever. In contrast to older forms of mechanical transmission of the kind having sets of ratio gears, the operator need not actuate and modulate a clutch and need not supply the mechanical force needed for clutching and gear shifting operations. While this greatly simplifies the tasks of the operator, a complex pneumatic circuit is required in order to realize this result. Prior U.S. Pat. Nos. 3,570,636; 3,667,309 and copending application Ser. No. 452,116 of Philip S. Webber, filed Mar. 18, 1974 for CONTROL SYSTEM FOR SHIFTING A DRIVE TRANSMISSION, assigned to the Assignee of the present application, disclosed several pneumatic circuits suitable for this purpose.

As may be seen by reference to the above-identified prior U.S. Pat. No. 3,667,309, effective operation of the transmission is dependent on the presence and the absence of fluid pressures in a large number of control circuit flow paths at particular times during operation of the system. Heretofore, testing of such a control circuit in the field to assure that pressure signals are present or absent from key points in the circuit as necessary at various phases of operation has been a very difficult and tedious task. If a simple pressure gage is used for this purpose, it must repeatedly be connected and disconnected from a large number of points in the circuit. Repeated partial disassembly and reassembly of circuit components may be necessary and a variety of special fittings may be needed. In some cases, the pressure signals to be detected are very brief and many pressure gages do not respond fast enough to provide a reliable indication of such signals. The difficulty of performing such tests in the field creates a problem from the standpoint of conducting routine maintenance checks to assure that the transmission control system is in good order and also complicates the task of identifying the particular source of a malfunction when one is known to be present.

SUMMARY OF THE INVENTION

This invention provides a testing instrument which may be quickly and conveniently connected into the pneumatic control circuit of a transmission to ascertain if appropriate pressures are present at key points as required at various stages of operation and to aid in identifying possible sources of malfunction.

The instrument includes a pressure indicator and a series of pneumatic signal lines which may be temporarily coupled to predetermined flow paths within the transmission control circuit through one or more connectors which enable simultaneous coupling of large numbers of such signal lines into the circuit at one time. A series of valves in the test instrument enables sequential temporary connection of each signal line to the pressure indicator. In a preferred form, the instrument includes signal holding means for maintaining the indicator in the pressure indicating condition once it has been activated by even a brief pressure signal until such time as a reset valve is operated to clear the instrument for testing of pressure at another point in the circuit. Means may also be provided for supplying compressed air to selected points in the transmission circuit through the test instrument itself to enable alternate forms of test operations and gage means may also be provided for obtaining a reading of pressure magnitude at selected points in the transmission circuit.

Accordingly, it is an object of this invention to simplify and facilitate the testing, maintenance and repair of transmissions of the kind which are shifted and controlled by pneumatic devices.

The invention, together with further objects and advantages thereof, will best be understood by reference to the following description of a preferred embodiment taken in conjunction with the accompanying drawings.

BRIEF DESCRIPTION OF THE DRAWINGS

In the accompanying drawings:

FIG. 1 is an exterior view of a test instrument in accordance with the invention, and also illustrates the manner of connection of the instrument into the control system of a pneumatically controlled vehicle transmission, and FIG. 2 is a pneumatic circuit diagram of the test instrument of FIG. 1 and also illustrates connector means, shown in exploded form, suitable for coupling the instrument into the control system of transmission.

DESCRIPTION OF A PREFERRED EMBODIMENT

Referring initially to FIG. 1 of the drawing, a tester 11 is shown coupled to the control system 12 of a pneumatically controlled transmission 13 for the purpose of checking operation of the system and to aid in the identification of possible malfunctioning components of the control system. The transmission 13 and control system 12 may be of the form described in prior U.S. Pat. No. 3,667,309 which is hereby incorporated by reference. Certain components of the transmission and control system will be herein briefly described in order to facilitate understanding of the coaction of the present invention therewith.

In a transmission 13 of this kind, an input shaft 14 may be coupled to change speed gearing 16 through an input clutch 17 and drive from the change speed gearing is transmitted to an output shaft 18 through a disengageable output clutch 19. In order to shift the transmission, both the input clutch 17 and output clutch 19 are disengaged, the change speed gearing 16 is then braked to a stationary condition to facilitate disengagements and engagements of shift clutches 21 as necessary to achieve a desired new drive ratio. The change speed gearing 16 is then reaccelerated while input clutch 17 and output clutch 19 are reengaged to establish drive through the transmission at the new drive ratio.

In order to shift the transmission, the operator need only pivot a control lever 22 from one position along an arc 23 to another. The necessary clutching and braking operations in the transmission 13, including shift clutch engagements and disengagements, input clutch modulation and the sequencing and timing of the various operations required to effect the shift are then accomplished automatically by the pneumatic control system 12 which has some components situated in a housing 12A situated at the transmission and which has other components situated within the shift lever housing 12B which may be remote from the transmission. Housings 12A and 12B are interconnected by a flexible cable 24 which contains a number of individual fluid pressure lines 26 through which pneumatic signals are transmitted from shift lever housing 12B to control circuit housing 12A at the transmission.

The control system operates from a compressed air supply tank 27 which may be charged by a compressor 28 driven by the engine of the associated vehicle or by other means. A supply conduit 29 transmits compressed air from tank 27 to control circuit housing 12A at through a junction block 31 which is provided to facilitate usage of the tester 11 as will hereinafter be described in more detail. Junction block 31 has a branch air passage 31' which extends to one surface of the block but which is normally closed off at that surface, when the tester 11 is not in use, by a plug plate 32. Compressed air from the supply is transmitted to the operator shift lever housing 12B through one of the lines 26A of cable 24.

The operator's shift lever housing 12B contains a series of two position cam operated pilot valves, a single one of the pilot valves 33 being shown in FIG. 1 for purposes of example. Each pilot valve 33 has a normal position at which an individual associated one of the fluid pressure lines 26, line 26B in this example, is vented. Upon piloting of the valve 33, line 26B is communicated with the air pressure supply line 26A thereby pressurizing line 26B. Other such valves, not shown, control the venting and pressurizing of others of the fluid pressure lines 26. Each such pilot valve 33 controls the engagement or disengagement of an individual one of the shift clutches in transmission 13. The valve 33 in this example controls engagement or disengagement of the illustrated shift clutch 21 which couples a ratio gear 36 to a main shaft section 37 of the transmission upon being engaged. Operator's shift lever 22 carries a cam plate 38 that pilots the particular ones of the pilot valves 33 that are associated with particular shift clutches which need to be engaged at each position of the shift lever. Thus cam plate 38 pilots valve 33 at those particular positions of the shift lever at which shift clutch 21 of the transmission is required to couple gear 36 to main shaft section 37.

As previously described, piloting of a particular valve 33 pressurizes a particular one of the lines 26B of cable 24. This line 26B is communicated with the pilot of another two position valve 38, within transmission control system housing 12A, through one input of a three way check valve 39. In the unpiloted position, valve 38 vents one end of a pneumatic cylinder or actuator 41 which through fork 42 operates the shift clutch 21. Upon being piloted by fluid pressure received from the operator's shift lever housing 12B as previously described, valve 38 transmits pressure to actuator 41 causing the shift clutch 21 to move axially and engage ratio gear 36 to main shaft 37. Others of the shift clutches 21 of the transmission are similarly operated by other valves and pneumatic actuators in response to pilot signals from the pilot valves of the shift lever housing 12B and the various other transmission operations required in connection with a shift are similarly initiated, timed and controlled by other elements of the pneumatic control system 12 in response to a movement of the operator's control lever 22.

Accordingly, it may be seen that proper operation of the control system is evidenced by the pressurization or depressurization of specific fluid flow paths within the control circuit 12 at particular times following a movement of the shift lever 22. As the particular flow paths which should be pressurized or unpressurized at a given time with reference to the position of shift lever 22 are ascertainable by studying the construction and operation of the control circuit 12 itself, it is possible to determine if a control system is functioning properly by checking for the presence or absence of pressure at key points within the pneumatic circuit while operating the transmission. Further, if the transmission is malfunctioning, location of the defective components or adjustments may be greatly facilitated by checking for the presence or absence of pressure at key points in the control circuit which points are known to be associated with certain specific components of the transmission or the control system. For example, if it can be determined that line 26B fails to exhibit pressurization following movement of the shift lever to a position at which it is known that such line should be pressurized, then it is made apparent that one of a very limited number of components is the malfunctioning element. Extensive disassembly of the transmission or control system in a blind search for problem areas may thereby be avoided. The tester 11 of the present invention enables these diagnostic operations to be quickly and easily performed.

A study of the pneumatic control circuit of prior U.S. Pat. No. 3,667,309 will show that much of the data needed to perform most diagnostic operations may be obtained by simply tapping into the signal lines 26 which extend between the shift lever housing 12B and the control circuit housing 12A at the transmission. To facilitate this, cable 24 is formed to have a disengageable coupling 43 at some point. While in some cases access to the lines 26 may be had by coupling in to the end of the cable which connects with shift lever housing 12B or to the other end of the cable which connects with transmission circuit housing 12A, in this example the connector is situated at an intermediate point along the length of the cable. When the tester 11 is not being used, connector 43 simply provides a through flow path for the several lines 26 of cable 24 between the shift lever housing 12B and transmission circuit 12a is indicated by dashed lines in FIG. 1. When the tester 11 is to be employed, connector 43 is temporarily disengaged by loosening bolts 44. The two halves of the connector are then rebolted to opposite sides of an adapter 46 carried at one end of a tester cable 47. Cable 47 is coupled to a tester housing 48 through a connector 49 at the other end of the cable. Referring now to FIG. 2, adapter 46 contains a series of passages 51 which maintain continuity of the signal lines 26 of cable 24 when the two halves of the connector 43 are secured to opposite sides of the adapter but also contains branch passages 52 which connect individual ones of a series of pneumatic signal lines 53 of tester cable 47 with individual ones of the passages 51. Thus the pressures which may be present in each line 26 of the transmission control system are transmitted to an associated individual one of the signal lines 53 of the tester cable 47 and then to the tester housing 48.

Referring now again to FIG. 1, some of the pneumatic signals of interest in diagnosing the control system are not found within the cable 24 but are internally produced within the control circuit housing 12A of the transmission. For example, circuit means 54 are present in housing 12A for pressurizing and depressurizing output clutch 19 through a conduit 56 at appropriate times. In order to enable checking of these pressures which are confined to the transmission 13 itself, tester cable 47 has another branch 57 ending in a fitting 58 which may be secured to the control circuit housing 12A when the tester is to be used. The control circuit housing is manufactured with a series of pneumatic signal passages 59 which extend between fitting 58 and individual key points in the circuit at which it may be desirable to check pressure. For example, one such passage 59A may communicate output clutch pressurization conduit 56 with fitting 58. Referring again to FIG. 2, tester cable branch 57 contains a series of signal lines 61 each of which is communicated with an individual one of the passages 59 when fitting 58 is secured to control circuit housing 12A. Referring back to FIG. 1, a seal plate 58' may be secured to control circuit housing 12A when the tester is not in use in order to close the several passages 59.

To supply compressed air from tank 27 to the tester 11 in order to operate components of the tester and to check the compressed air supply itself, still another branch 62 of tester cable 47 has an end fitting 63 which is secured to junction block 31 over branch passage 31' after the previously described seal plate 32 has been removed. Referring now again to FIG. 2, tester cable branch 62 forms a single air supply flow path which communicates with an air supply line 64 within the tester housing 48.

Considering now the internal pneumatic circuit of the tester housing 48, an individual one of a series of test valves 66 is coupled between a test pressure conduit 67 and each individual one of the signal lines 53 and 61 of the tester cable so that by selectively closing any one of the valves 66, any pressure which may exist in that particular signal line at that time may be selectively communicated to the test pressure conduit. A first pressure gage 68 may be coupled to conduit 67 so that a precise reading of the pressure in any of the various key points of the transmission control circuit may be made by closing of the particular test switch 66 which is communicated with that point through the previously described signal lines. However, in many cases, it is simply the presence or absence of at least a predetermined degree of pressure at a particular point at a particular time which is of interest rather than a precise reading of the magnitude of such pressure. In these cases, a quick check of key pressures is accomplished by operating the test switches 66 in sequence while observing a fast response pneumatic indicator 69 to determine if adequate pressure is present or absent at each key point of the control circuit. Indicator 69 may be any of various devices which produce a visible or audible signal upon being pressurized above some predetermined level. For example, the indicator 69 may have a dished disc spring element 71 formed of resilient material and which is bi-stable in that it may be sprung from the position indicated in solid lines in FIG. 2 to that indicated in dashed lines and back by axial forces. Disc 71 may extend across a chamber 72 having a pressure input line 73. A rod 74 may extend from the side of disc 71 opposite input line 73 into a guide 76 which contains a spring 77 normally urging the rod and disc toward the solid line position. A transparent window 78 may be provided in guide 76 at a position at which the rod 74, which may be brightly colored, is not visible when the disc is in the solid line position, but becomes readily visible when the disc is distorted to the dashed line position by fluid pressure in chamber 72. In the absence of such pressure, spring 77 restores the disc to the solid line position. Thus indicator 69 provides for a visible indication of the presence or absence of significant pressure at input line 73.

While indicator 69 might be directly coupled to test pressure conduit 67 insofar as some of the desired pressure sensing operations are concerned, the tester is made versatile and more reliable and convenient to use by making this connection through additional elements which in effect provide a memory or signal storage capability to the indicator. Some of the pressures of the transmission control circuit which it may be desired to check occur only briefly at certain stages of a shift of the transmission. By providing a signal storage capability to the indicator 69, the indicator remains in the pressure indicating condition, following even a very brief pressure signal until such time as the operator resets the tester for a subsequent pressure check as will hereinafter be described.

To provide the signal storage capability, a two-position latching valve 79 is connected between air supply line 64 and input 73 of the indicator and is spring biased towards an unpiloted position at which the indicator input is vented to exhaust. Valve 79 has a piloted position at which the air supply line 64 is communicated to the indicator input 73 to shift the indicator to the pressure indicating condition. The pilot of valve 79 is coupled to test pressure conduit 67 through a check valve 81 of the form which normally blocks release of pressure from the valve pilot into conduit 67 but which may be forced open to allow such pressure release upon pressurization of a check valve pilot signal line 82.

Upon closing of any one of the test valves 66, any pressure in the associated signal line 53 or 61 is communicated to conduit 67 and such pressure is in turn communicated to the pilot of latching valve 79 through check valve 81. The resultant piloting of valve 79 communicates air supply line 64 with indicator 69 which then shifts to the pressure indicating condition. Inlet 73 of the indicator 69 is communicated with the pilot of valve 79 through a flow restriction 83. Thus once the valve 79 has been momentarily piloted by even a brief pressurization of conduit 67, the valve is held in the piloted condition since pressure may now reach the pilot of the valve through restriction 83 independently of conduit 67.

After a particular one of the test valves 66 has been closed causing pressurization of conduit 67 and piloting of valve 79 to shift indicator 69 to the pressure indicating condition, it is necessary to reset the system before closing another of the test valves 66 to a check another portion of the control circuit. For this purpose, a reset valve 84 is momentarily operated to communicate check valve pilot line 82 with air supply line 64 while simultaneously venting test pressure conduit 67 to exhaust. Accordingly, upon operation of reset valve 84, any pressure which may be present in conduit 67 is released and a pilot signal is simultaneously sent to check valve 81. This opens the check valve to release pilot pressure from latching valve 79. Flow restriction 83 prevents immediate repressurization of the pilot of valve 79 enabling valve 79 to revert to the unpiloted condition at which indicator 69 is vented. Thus the indicator also reverts to the condition indicative of no pressure thereby readying the entire tester circuit for operation of another one of the test valves 66 in order to check for pressure in another portion of the transmission control circuit.

Indicator 69 provides the information needed for many diagnostic tests since it is often only necessary to know if particular flow paths in the control circuit are unpressurized or pressurized above some predetermined level at a particular time. But, if necessary, the pressure gage 68 may be consulted to obtain a magnitude reading of such pressurizations. However, referring again to FIG. 1, there may be one or more points in the control circuit where a simple indication of adequate pressurization or no pressurization does not usually provide all the data which may be useful for diagnostic purposes. At some circuit points there may be several different specific levels of pressure required at different stages of operation of the transmission, and it may be highly useful to be able to continually monitor the pressure level at those points. The actuation pressure supplied to the rear clutch 19 of the transmission through conduit 56 of the transmission is an example inasmuch as the control circuit may apply several different pressure levels to the rear clutch depending on torque requirements of the particular engine and vehicle in which the transmission is used. Thus the particular signal line 59A which transmits output clutch pressure to tester cable 57 may, as illustrated in FIG. 2, be connected to a second pressure gage 86 mounted on the tester housing 48 instead of being connectable to test pressure conduit 67 through one of the switches 66 so that a continuous reading of output clutch pressure level is provided.

It may also be useful in diagnosing possible problems in the transmission control system to be able to initially check the pressure of the air supply itself. For this purpose, an additional valve 87 may be coupled between air supply line 64 and test pressure conduit 67. Upon closing of valve 87, supply line pressure is communicated to gage 68 and may be checked for sufficiency by reading the gage.

Referring again to FIG. 1, the several test valves 66 and air supply test valve 87 may conveniently be arranged in a column with a toggle lever 88 for operating each such valve projecting from the face of tester housing 48. Similarly the faces of pressure gages 68 and 86 and pneumatic indicator 69 are preferably exposed at the same face of the housing. The reset switch 84 preferably has a large depressible actuator button 89 also mounted on the same surface of the housing so that it may be rapidly and easily depressed briefly after each operation of one of the test switches 66. Legends 90 or other appropriate indicia may be marked upon the surface of the housing adjacent each switch 66, 88 and the gages and indicators 68, 69 and 86 to facilitate operation.

To perform a test of the transmission control system 12, tester cable 47 is connected into control system cable 24, control circuit housing 12A and air supply junction block 31 as previously described. It should be noted that this does not in any way interfere with the operation of the transmission and the control system.

The tester 11 may then be utilized in any of a variety of ways to facilitate checking of the transmission and control system for proper operation or to aid in identifying the probable source of a malfunction. Referring again to FIG. 2, the test operator will typically begin by momentarily closing valve 87 and reading gage 68 to ascertain that the vehicle air supply pressure is adequate. Reset valve 84 is then momentarily operated to exhaust conduit 67 in preparation for the next step. With shift lever 22 at a known setting, the several test valves 66 may be operated in sequence with reset valve 84 being operated in between each operation of a valve 66, while indicator 69 is observed to determine if pressure is present in those lines where it is known that it should be present at that position of the gear shift lever and to determine that pressure is absent from those lines where it should be absent at that gear setting. If an irregularity in the pressurization or depressurization of a particular point in the circuit is observed in the course of this test, then it is apparent that it is very probable that a malfunction is due to one of a limited number of components that are known to be associated with that point in the circuit. Disassembly of the transmission and control system may then be limited to that necessary to service the faulty component.

In another mode of use, the tester 11 may itself be used to pressurize and depressurize appropriate points in the transmission control circuit to accomplish a particular shift independently of the portion of the control circuit situated in the shift lever housing 12B. This may be done by closing particular ones of the switches 66 which are associated with particular points in the circuit which are to be pressurized to accomplish the desired shift and by then closing valve 87 to supply pressurized air to those points through the tester. If this accomplishes the desired shift without malfunction, it is then clear that the problem area is in the shift lever housing 12B.

In a somewhat similar manner, the tester 11 may be used to check for leakage in selected portions of the transmission control circuit. Specifically, valve 87 may be closed to pressurize test pressure conduit 67 and then reopened. If a single one of the test valves 66 is then closed to pressurize one particular portion of the control circuit, gage 68 may be observed over a period of time to observe the rate of pressure drop and if this is more rapid than normal, defective seals or other faults in that specific portion of the control circuit may be reliably assumed to be present.

The tester 11 may be used in another manner to check for possible blockage of various lines in the control circuit. Cable 24 may be disconnected at each end from transmission circuit housing 12A and shift lever housing 12B and one end may be temporarily closed while the other remains open. If valve 87 is then closed to pressurize test pressure conduit 67, individual ones of the test valves 66 may then be closed in sequence to direct air to the several lines 26 of cable 24. If in the course of this test, a more than minimal pressure reading is observed at gage 68, it is indicative of a complete or partial blockage of the particular line 26 associated with the valve 66 which is closed at that time.

While the example of the invention described above is specifically adapted to the testing of one particular form of transmission, it will be apparent that modifications may be made to accommodate to the testing of transmissions which may employ a somewhat different pneumatic control circuit having differing numbers of flow paths to be checked. Thus while the present example employs sixteen test valves 66 in conformity with the number of points in this particular control circuit 12 from which pressure readings may be needed to facilitate diagnosis of malfunctions, a larger or smaller number of such test valves may be employed as necessary for proper diagnosis of other pneumatic transmission control circuits.

While the invention has been described with respect to a particular embodiment, it will be apparent that many modifications are possible and it is not intended to limit the invention except as defined in the following claims.

What is claimed is:

1. Apparatus for testing a pneumatic circuit that has a pressurized fluid supply and a plurality of fluid flow paths which are individually pressurized from said supply in predetermined combinations to control a plurality of pneumatic devices in a transmission, comprising:
   a test pressure conduit,
   pressure sensing means for indicating the presence or absence of a predetermined degree of pressure in said test conduit,
   a plurality of pneumatic signal lines,
   a plurality of test valves each being coupled between said test pressure conduit and an individual one of said pneumatic signal lines,
   connector means for temporarily coupling individual ones of said signal lines with separate individual ones of said flow paths of said circuit which is to be tested,
   a pressurized fluid supply line,
   connector means for selectively coupling said fluid supply line to said pressurized fluid supply independently of said pneumatic circuit to be tested, and
   a pressure test valve connected between said fluid supply line and said test pressure conduit whereby said testing apparatus may be operated to selectively pressurize ones of said pneumatic signal lines.

2. Apparatus for testing a pneumatic circuit that has a pressurized fluid supply and a plurality of fluid flow paths which are individually pressurized from said supply in predetermined combinations to control a plurality of pneumatic devices in a transmission, wherein said pneumatic devices are internal components of said transmission and wherein at least a portion of said fluid flow paths extend within a cable which connects said devices with an operator's shift signal initiating means, comprising:
   a test pressure conduit,
   pressure sensing means for indicating the presence or absence of a predetermined degree of pressure in said test conduit,
   a plurality of pneumatic signal lines,
   a plurality of test valves each being coupled between said test pressure conduit and an individual one of said pneumatic signal lines,
   connector means for temporarily coupling individual ones of said signal lines with separate individual ones of said flow paths of said circuit which is to be tested, and
   connector means for temporarily coupling individual ones of said pneumatic signal lines with individual ones of said flow paths within said cable.

3. The apparatus defined in claim 2 further comprising additional connector means for temporarily coupling other individual ones of said pneumatic signal lines with individual flow paths within said transmission.

4. The apparatus defined in claim 3 further comprising first and second pressure gages, means coupling said first pressure gage to said test pressure conduit and means coupling said second pressure gage to a predetermined one of said pneumatic signal lines.

5. Apparatus for testing a pneumatic circuit that has a pressurized fluid supply and a plurality of fluid flow paths which are individually pressurized from said supply in predetermined combinations to control a plurality of pneumatic devices in a transmission, comprising:
   a test pressure conduit,
   pressure sensing means for indicating the presence or absence of a predetermined degree of pressure in said test conduit, wherein said pressure sensing means has a pneumatic indicator of the form having an inlet and which shifts to a pressure indicating condition when the pressure at said inlet is above a predetermined level,
   a latching valve connected between said indicator inlet and a pressurized fluid supply and having an unpiloted position at which said supply is isolated from said inlet and said inlet is vented and having a piloted position at which supply is communicated with said inlet to shift said indicator to said pressure indicating condition,
   a check valve connected between said test pressure conduit and the pilot of said latching valve to pilot said latching valve to said piloted position thereof in response to pressure in said test pressure conduit while normally blocking release of pilot pressure from said latching valve, said check valve having pilot means for selectively forcing opening of said check valve to release pilot pressure from said latching valve,
   a flow restriction connected between said inlet of said indicator and said pilot of said latching valve,
   a reset valve having means for selectively piloting said check valve to release pilot pressure from said latching valve and for simultaneously venting said test pressure conduit,
   a plurality of pneumatic signal lines,
   a plurality of test valves each being coupled between said test pressure conduit and an individual one of said pneumatic signal lines, and
   connector means for temporarily coupling individual ones of said signal lines with separate individual ones of said flow paths of said circuit which is to be tested.

6. Apparatus for testing a pneumatic circuit that has a pressurized fluid supply and a plurality of fluid flow paths which are individually pressurized from said supply in predetermined combinations to control a plurality of pneumatic devices in a transmission, comprising:
   a test pressure conduit,
   pressure sensing means for indicating the presence or absence of a predetermined degree of pressure in said test conduit,
   a plurality of pneumatic signal lines,
   a plurality of test valves each being coupled between said test pressure conduit and an individual one of said pneumatic signal lines, and
   connector means for temporarily coupling individual ones of said signal lines with separate individual ones of said flow paths of said circuit which is to be tested, wherein said test pressure conduit, said pressure sensing means and said plurality of test valves are contained in a portable housing and wherein said pneumatic signal lines are contained within a cable extending from said housing, said cable having adapter means at the end thereof for simultaneously coupling a plurality of said signal lines to a plurality of individual ones of said fluid flow paths of said circuit.

7. Apparatus for testing pressure conditions at a plurality of flow paths within a pneumatic circuit which controls a vehicle transmission comprising:
   a housing,
   a cable extending from said housing and containing a plurality of pneumatic signal lines and having an adapter at the end for temporarily coupling individual ones of said signal lines to individual ones of said flow paths of said pneumatic circuit,
   a test pressure conduit within said housing,
   a pneumatic indicator device having means for indicating the presence of fluid pressure at an inlet of said device,
   means for pressurizing said inlet of said pneumatic indicator in response to pressurizing of said test pressure conduit,
   a plurality of individually operable test valves each being connected between said test pressure conduit and an associated individual one of said pneumatic signal lines, and
   an additional valve for selectively pressurizing said test pressure conduit independently of said test valves and pneumatic signal lines.

8. Apparatus as defined in claim 7 wherein said means for pressurizing said inlet of said pneumatic indicator in response to pressurization of said test pressure conduit comprises:
   a pilot pressure operated latching valve coupled to said pneumatic indicator inlet and having an unpiloted position at which said inlet is vented and having a piloted position at which said inlet is pressurized,
   means forming a restricted fluid flow path between said pneumatic indicator inlet and the pilot of said latching valve,
   a check valve connected between said pilot of said latching valve and said test pressure conduit for transmitting pressure from said conduit to said pilot of said latching valve while normally blocking release of pressure from said pilot of said latching valve to said conduit, said check valve having pilot means for forcibly opening said check valve, and
   a reset valve having means for piloting said check valve while simultaneously venting said test pressure conduit.

* * * * *